Dec. 2, 1952     E. E. HOSEA     2,619,879
MACHINE TOOL
Filed July 22, 1946     9 Sheets-Sheet 3
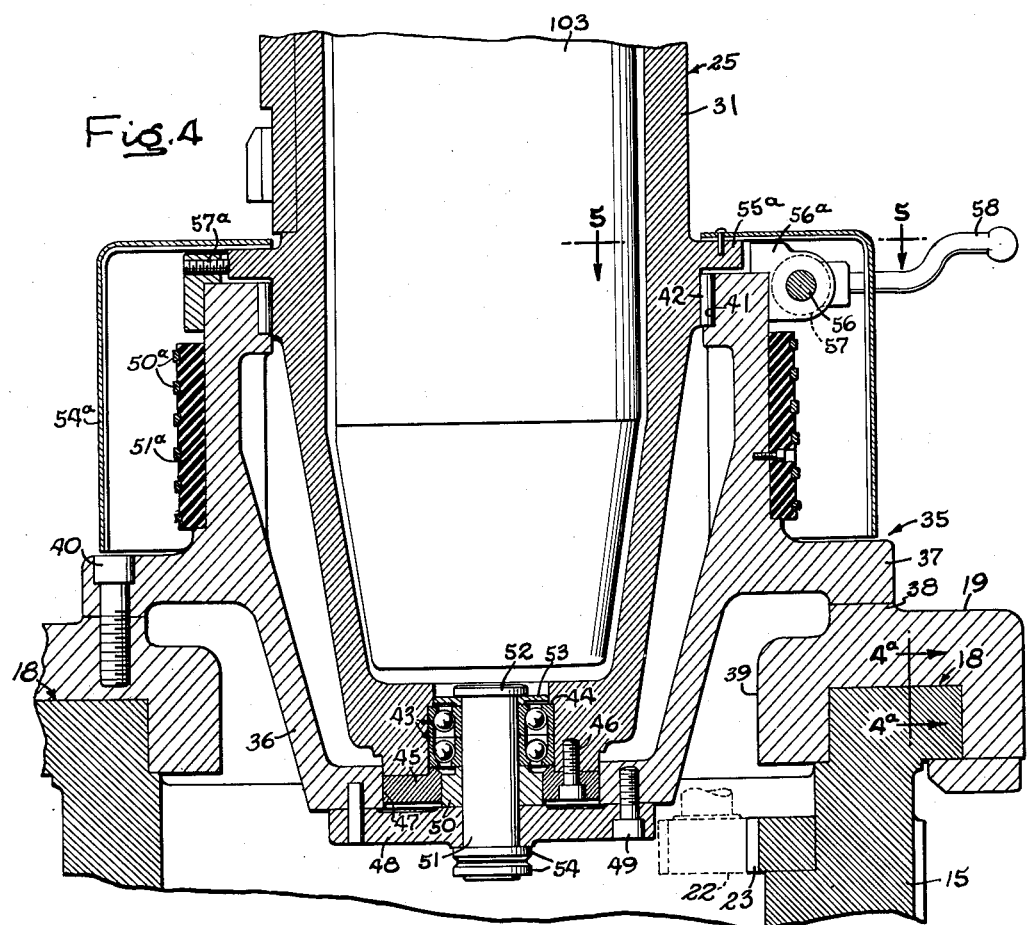
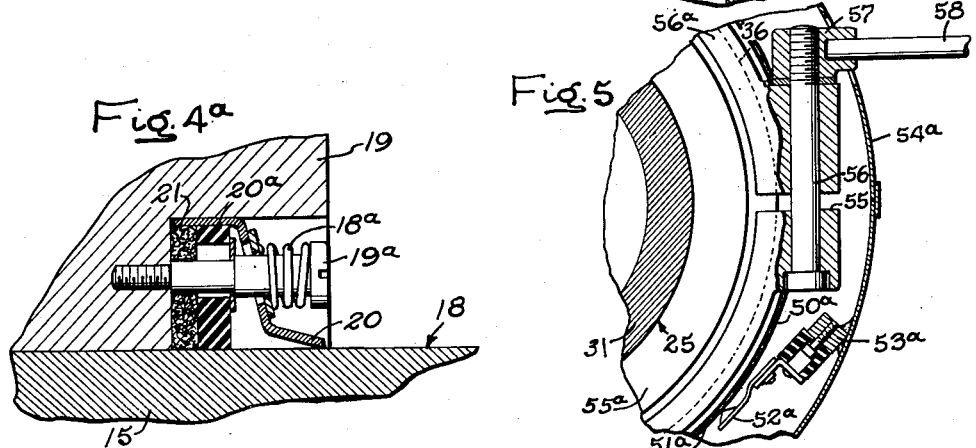
INVENTOR
Everett E. Hosea
By Carlson, Pitzner, Hubbard & Wolfe
ATTORNEYS

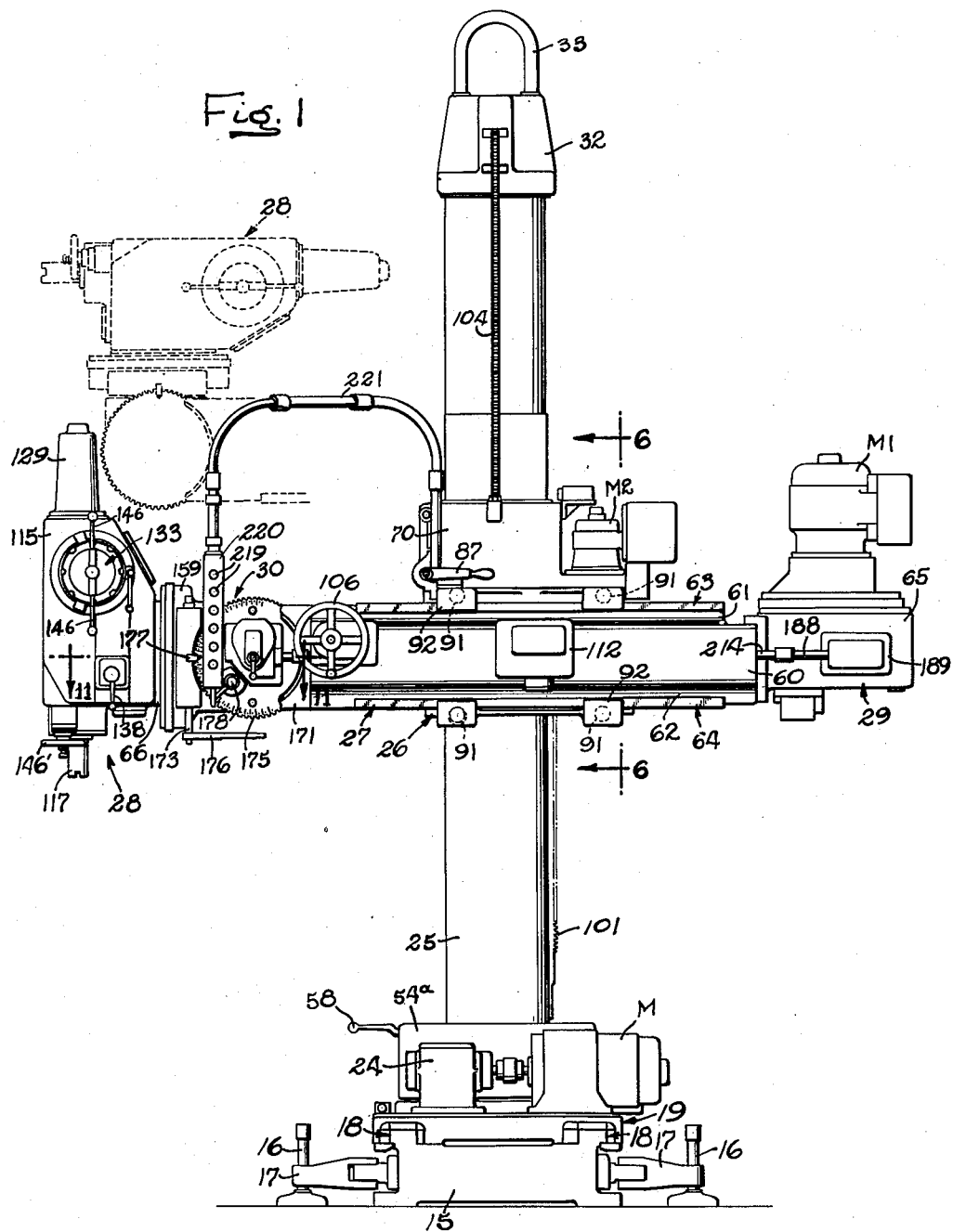

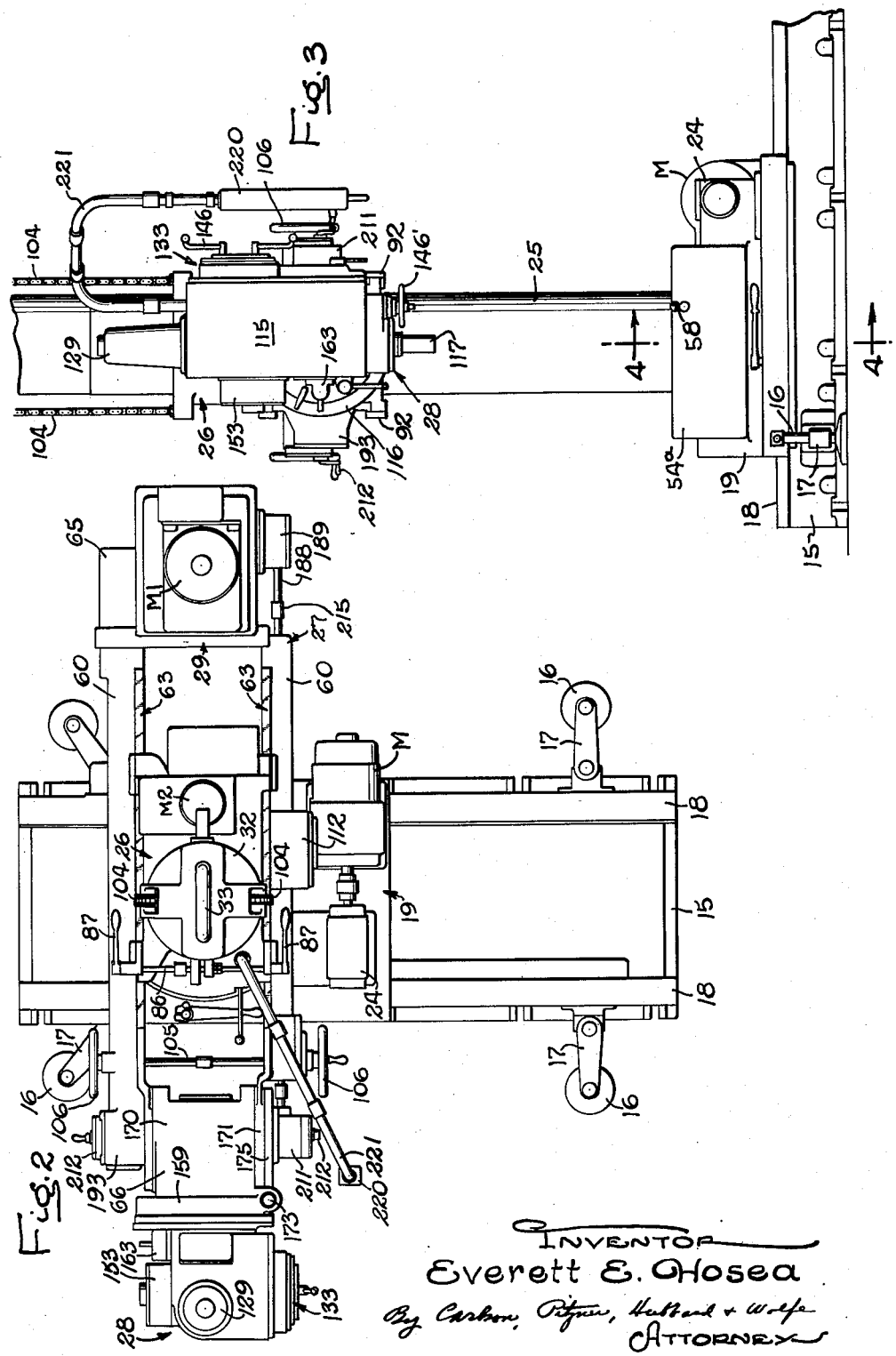

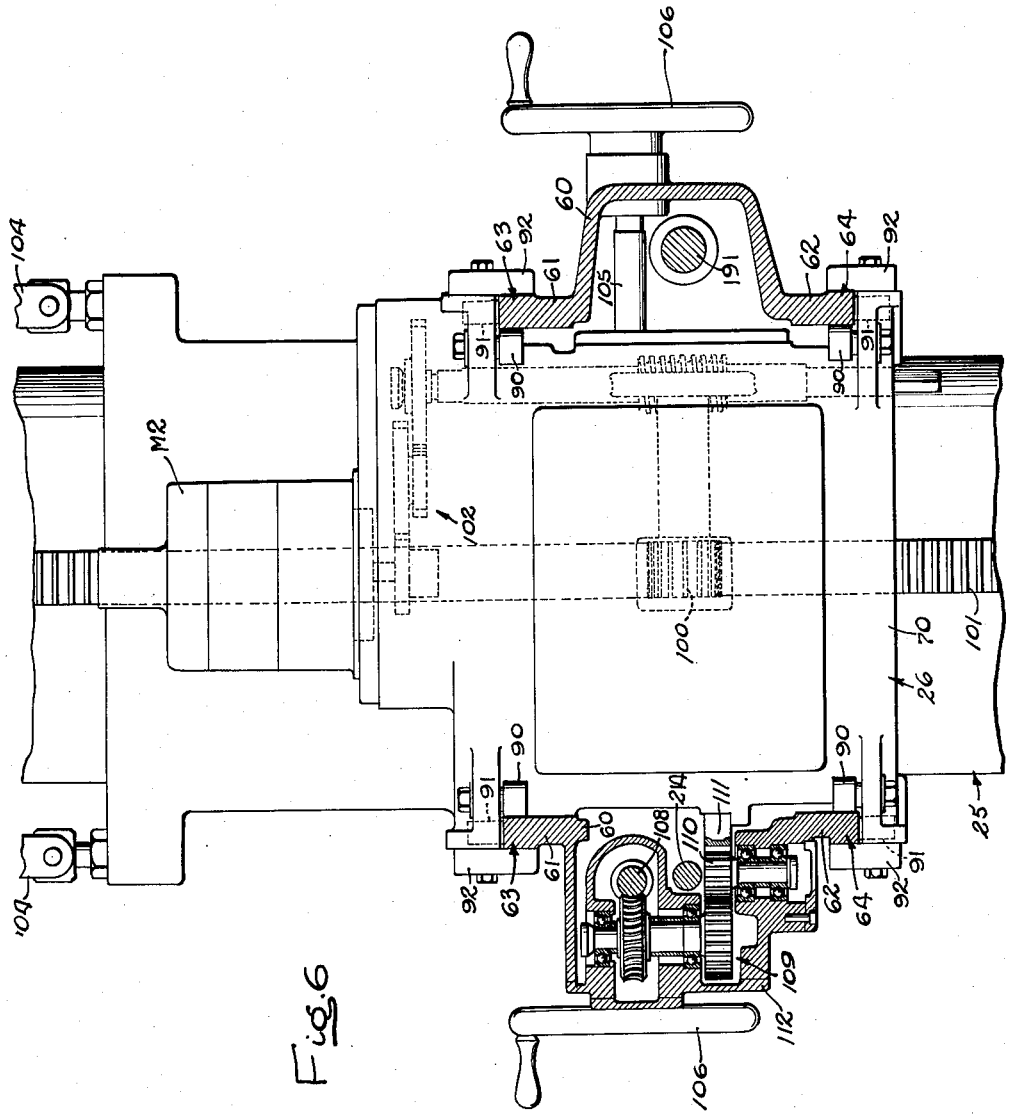

Dec. 2, 1952 E. E. HOSEA 2,619,879
MACHINE TOOL

Filed July 22, 1946 9 Sheets-Sheet 5

INVENTOR
Everett E. Hosea
By Carlson, Pitzner, Hubbard & Wolfe
ATTORNEYS

Dec. 2, 1952 E. E. HOSEA 2,619,879
MACHINE TOOL
Filed July 22, 1946 9 Sheets-Sheet 6
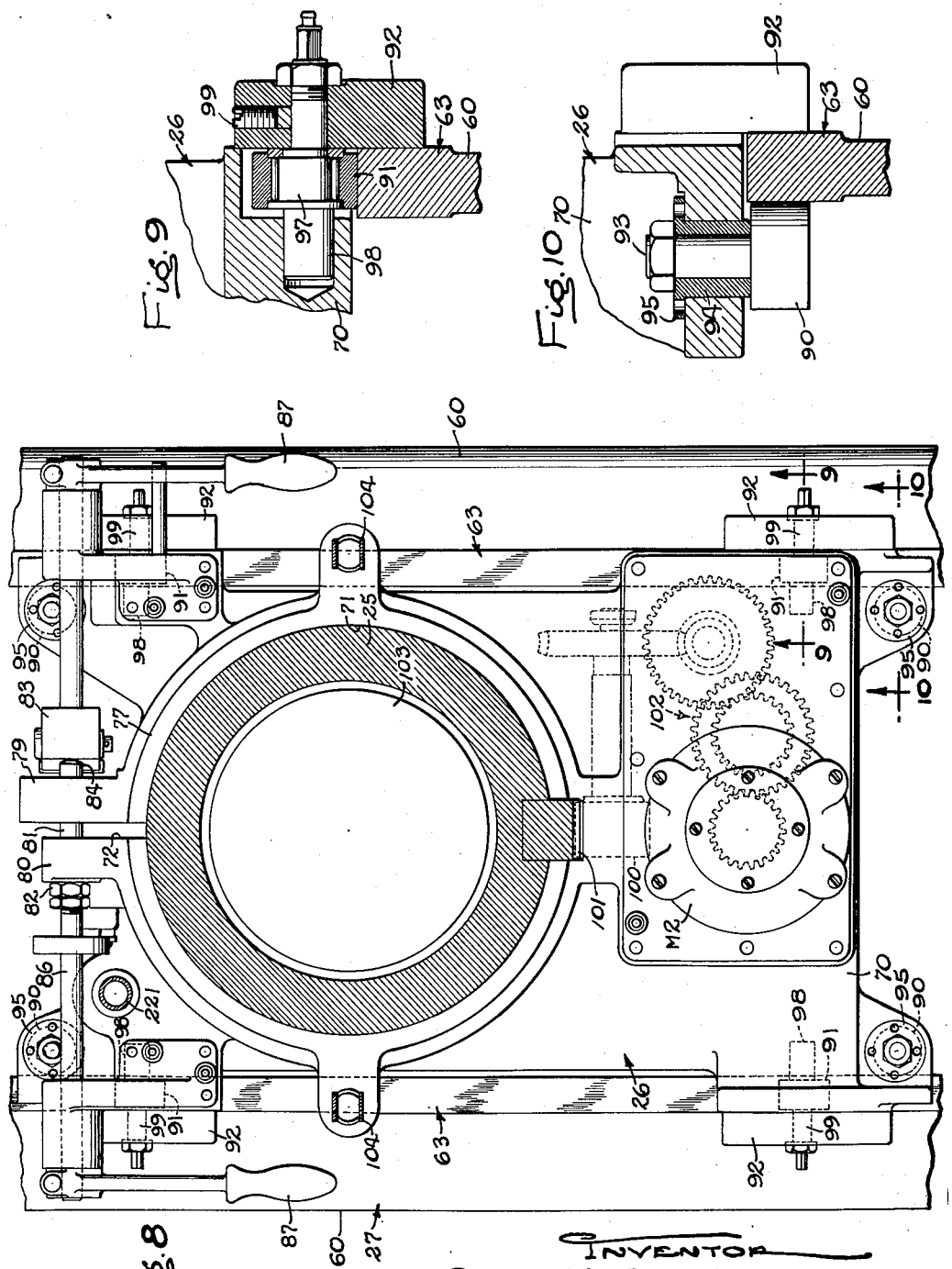
INVENTOR
Everett E. Hosea
By Carlson, Pitzner, Hubbard & Wolfe
ATTORNEY Dec. 2, 1952   E. E. HOSEA   2,619,879
MACHINE TOOL
Filed July 22, 1946   9 Sheets-Sheet 7

INVENTOR
Everett E. Hosea
By Carlson, Pitzner, Hubbard & Wolfe
ATTORNEYS

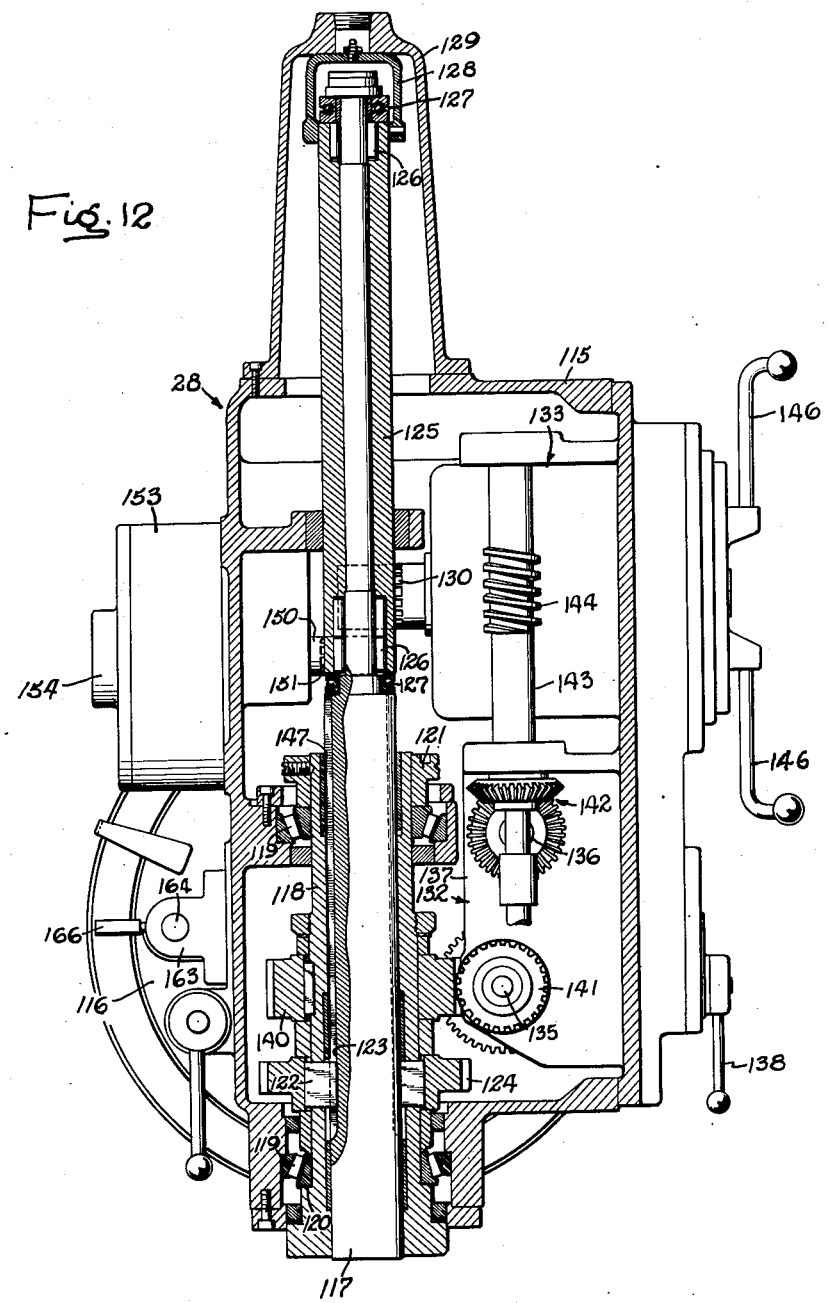

Dec. 2, 1952          E. E. HOSEA          2,619,879
MACHINE TOOL
Filed July 22, 1946          9 Sheets-Sheet 9
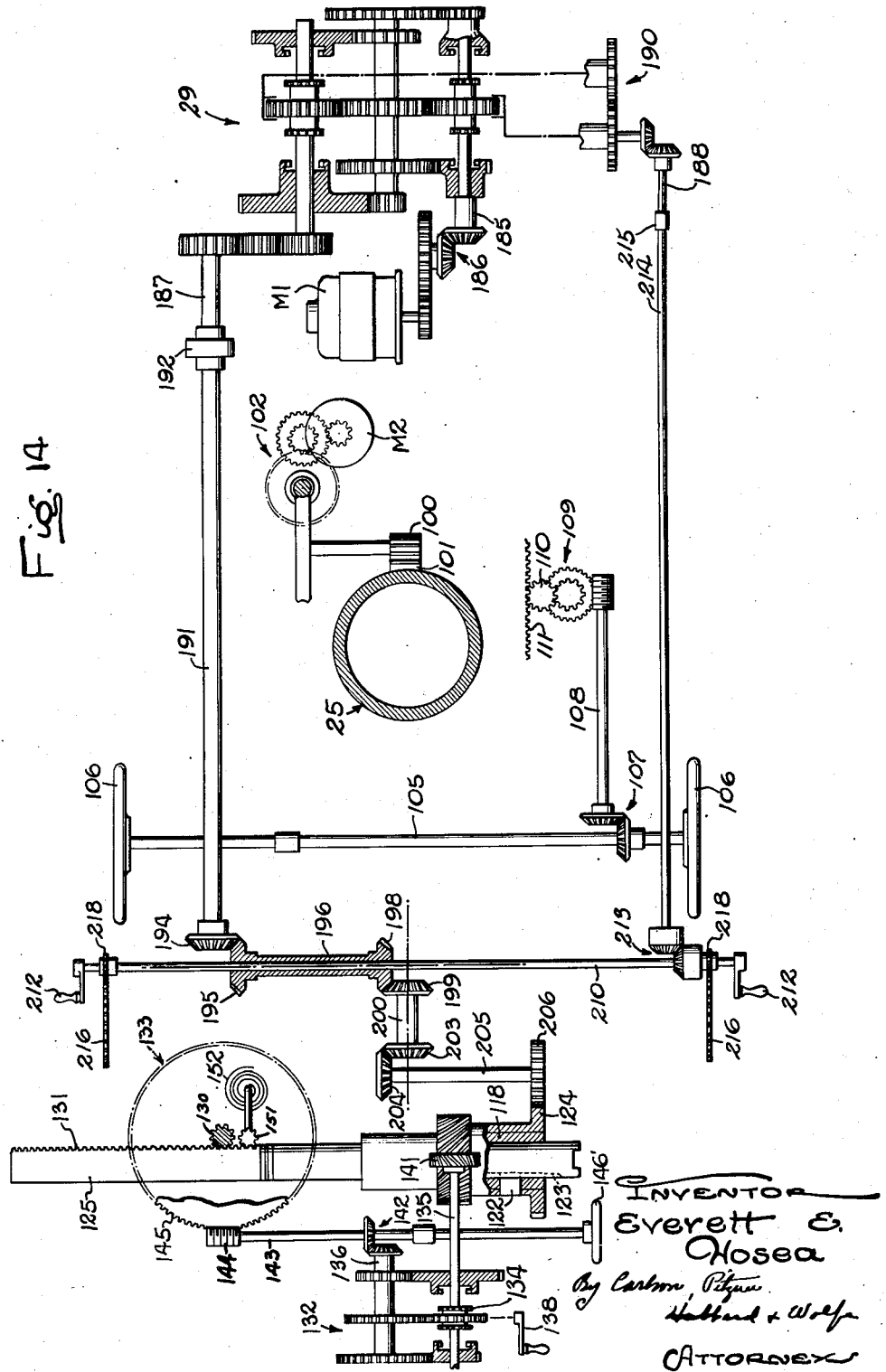

Patented Dec. 2, 1952

2,619,879

UNITED STATES PATENT OFFICE 2,619,879

MACHINE TOOL

Everett E. Hosea, Kaukauna, Wis., assignor to Kaukauna Machine Corporation, Kaukauna, Wis., a corporation of Wisconsin Application July 22, 1946, Serial No. 685,527

11 Claims. (Cl. 90—17)

The invention relates to machine tools generally, and more particularly to a machine tool for performing boring, milling and tapping operations.

One general object of the invention is to provide a portable machine tool of the above general character suitable for machining castings, or other metal structures that are too large to be handled by conventional machine tools, and capable of performing a wide variety of machining operations with substantially the same degree of precision as conventional machine tools.

Another object is to provide a new and improved machine tool in which a crossrail vertically adjustable on an upright column supports a spindle headstock on one end and a driving mechanism for the headstock on the other end so as to obtain a substantial counterbalance and thereby minimize the strains imposed on the column and associated parts.

Another object is to provide improved support and guide means for the crossrail of the machine which permits easy movement of the rail and which is readily adjustable for proper coaction with the guide surfaces of the rail at all times.

Still another object is to provide improved means for supporting the headstock on the rail for universal adjustment, together with means for providing a driving connection between the headstock and a stationarily supported transmission in all positions of the headstock.

A further object is to provide improved means for clearing the ways of chips or other foreign material and for insuring proper lubrication of the same.

Other objects and advantages of the invention will become apparent from the following detailed description of the preferred embodiment illustrated in the accompanying drawings, in which:

Figure 1 is an end elevational view of a machine tool embodying the features of the invention.

Fig. 2 is a plan view of the machine.

Fig. 3 is a side elevational view of the machine.

Fig. 4 is a fragmentary sectional view of the column and its support taken in a vertical plane substantially on the line 4—4 of Fig. 3.

Fig. 4a is a fragmentary sectional view taken in the vertical plane substantially on the line 4a—4a of Fig. 4.

Fig. 5 is a fragmentary sectional view of the column support taken in a horizontal plane substantially on the line 5—5 of Fig. 4.

Fig. 6 is a side elevational view of the rail slide showing the rail in section substantially on the line 6—6 of Fig. 1.

Fig. 8 is a plan view of the rail slide with the column shown in transverse section.

Fig. 9 is a sectional view taken in a horizontal plane substantially on the line 9—9 of Fig. 8 and showing the construction of one of the crossrail supporting and guiding rollers.

Fig. 10 is a sectional view taken in a vertical plane substantially on the line 10—10 of Fig. 8 and showing the construction of another of the crossrail supporting and guiding rollers.

Fig. 12 is a sectional view of the headstock taken in a vertical plane substantially on the line 12—12 of Fig. 11.

Fig. 14 is a diagrammatic layout of the various feed and drive mechanisms provided in the machine.

Figure 7:
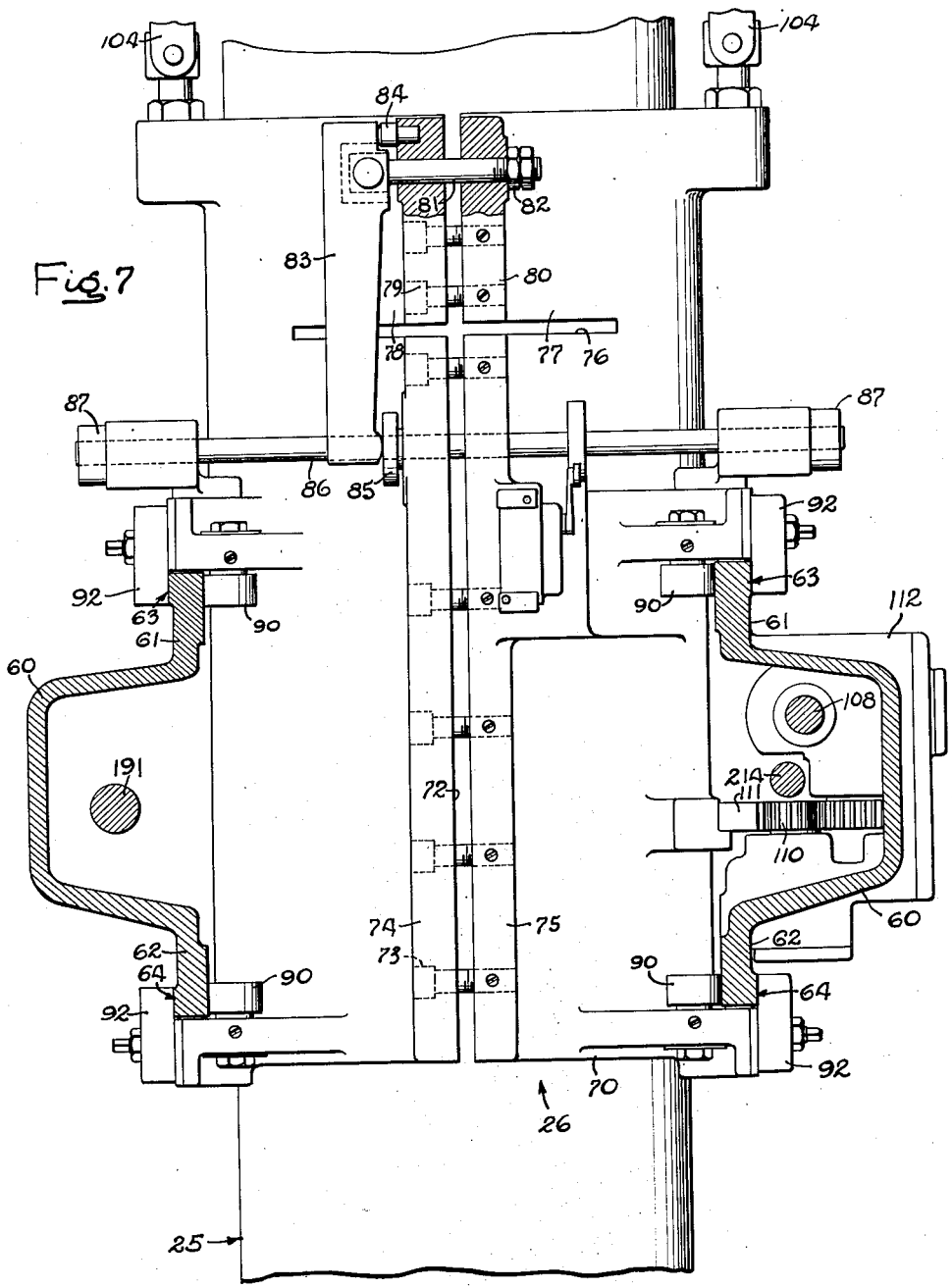
Fig. 7 is an elevational view of the rail slide as viewed from the opposite side.

While the invention is susceptible of various modifications and alternative constructions, I have shown in the drawings and will hereinafter describe in detail the preferred embodiment, but it is to be understood that I do not thereby intend to limit the invention to the specific form disclosed, but intend to cover all modifications and alternative constructions falling within the spirit and scope of the invention as expressed in the appended claims.

By way of illustration the invention has been shown and will be described herein as embodied in a machine tool adapted to be carried to the work and capable of performing precision machining operations without being anchored to the floor. The improved machine is in some respects similar to a radial drilling machine, and additionally embodies many of the characteristics of the so-called horizontal boring machines. The various features of the invention incorporated in the machine give it a relatively large operating range for its size, enable it to perform a wide variety of different machining operations with a high degree of precision, and permit the tool to be presented to the work in substantially any desired position or direction without moving the machine.

General organization of the machine

Referring more particularly to the drawings, the exemplary machine comprises an elongated bed 15 (Figs. 1–4) adapted to rest upon the floor alongside a workpiece to be machined. The bed is a heavy rigid structure, and is provided with outboard jacks 16 for leveling purposes and to widen the base of support so as to prevent tipping when the machine is in use. The jacks 16, as shown, are screw-threaded into laterally projecting brackets 17 pivotally mounted on the sides of the bed so that they may be swung to an out of the way position when the machine is to be moved from one position to another.

The bed 15 is provided along its upper side with spaced horizontal guides or ways 18 upon which a carriage 19 is adapted to travel. To keep the guideway free of chips or other foreign material, the carriage is provided with a wiper, herein shown as comprising a scraper plate 20 (Fig. 4a) disposed transversely of the guideway 18 in edgewise relation thereto. One edge of the plate 20 is fulcrumed against the carriage and the other is yieldably held in engagement with the guideway by a spring 18a interposed between the plate and the head of a retaining screw 19a threaded into the carriage. A pad 20a of rubber or like material loosely disposed about the screw 19a between the scraper blade and the carriage is adapted to bear against the guideway to wipe off any foreign material that finds its way past the blade. The pad 20a, of course, removes the lubricant from the guideway and to avoid scoring of the same, provision is made for applying fresh lubricant thereto. As herein shown, this means comprises a pad 21 of felt or other absorbent material which may be kept saturated with lubricant in any preferred manner.

Suitable power driven means, including a pinion 22 (Fig. 4) journaled on the carriage 19 and meshing with a rack 23 extending longitudinally of the bed 15, is provided for traversing the carriage on the ways. As herein shown, the pinion 22 is driven by an electric motor M through a transmission 24 mounted at one end of the carriage.

Mounted on the carriage 19 is an upright column 25 which serves as a support and guide for a vertically reciprocable slide 26 which, in turn, supports and guides a crossrail 27 for endwise movement transversely of the column. The crossrail carries a headstock 28 together with suitable power means, including a driving motor M1 and an adjustable speed transmission 29 for driving the headstock spindle. The headstock, the motor M1, and the transmission 29 are mounted on the rail 27 in novel manner to counterbalance each other and thus relieve the strains on the column as will appear presently. Suitable power means including a motor M2 is provided for traversing the slide 26 on the column 25.

The carriage 19, slide 26 and rail 27 by their combined movements provide three dimensional adjustments for the headstock 28. The horizontal range of adjustment provided by the carriage and the crossrail movement is further extended by mounting the column 25 for rotative movement about its longitudinal axis. In the exemplary machine, the headstock 28 is mounted on the crossrail 27 through the medium of a double swivel connection indicated generally at 30, which permits 360° rotation of the headstock about an axis perpendicular to the spindle, and also 180° rotation about an axis substantially perpendicular to the axis of the rail. The tool carried by the spindle may therefore be presented to the work in substantially any desired angular position.

Column construction and mounting

As the column 25 provides the sole support for the operating elements of the machine, it is strongly and rigidly constructed to resist bending or other deformation under the lateral thrust and twisting strains resulting from the feeding of the tool to the work or imposed thereon when the crossrail is shifted to an unbalanced position. Preferably the column 25 comprises a hollow cylindrical casting having thick side walls 31 (Fig. 4) smoothly finished on their outer surface to form a guideway for the slide 26. The upper end of the column is closed by a cap 32 which is rigidly secured in place thereon and provided with an upstanding yoke 33 for engagement by the hook of a crane or hoist for lifting and transporting the machine.

The column 25 is rotatably supported on and secured to the carriage 19 by a socket structure 35 (Fig. 4) of sturdy construction providing widely spaced radial and end thrust bearings adapted to carry the weight of the column and associated elements and to withstand the severe radial and twisting stresses imposed on the column when the machine is in operation. The socket structure as herein shown comprises a generally conical socket member 36 having intermediate its ends an integral outwardly projecting circumferential flange 37 adapted to rest on an upstanding annular shoulder 38 encircling an opening 39 in the top of the carriage 19. The flange may be rigidly secured to the carriage, as by machine screws 40.

In the exemplary machine, the socket structure is arranged to provide at its upper end a radial bearing for the column 25 and at its lower end a combinated radial and thrust bearing for the same. For this purpose the upper end of the member 36 is formed with an inwardly opening circumferential groove 41 (Fig. 4) constituting a raceway for a series of roller bearings 42 adapted to coact with a suitable outwardly facing circumferential bearing surface formed concentrically on the wall 31 of the column.

At its lower end, the column 25 is formed with an axially alined recess for the accommodation of a pair of antifriction radial and thrust bearings 43 which have their outer race rings rigidly clamped between a shoulder 44 at the base of the recess and a clamping ring 45 secured to the end of the column as by machine screws 46. The end portion of the column 25 and the ring 45 are cylindrically dimensioned to fit snugly in an opening 47 in the bottom of the socket member 36 over which a thrust plate 48 is bolted or secured by machine screws 49. A thrust block 50 interposed between the inner race rings of the bearings 43 and the plate 48 transfers the axial thrust of the column 25 to the plate.

A pin 51 extending through the bearings 43 and through an aperture in the thrust plate 48 serves to hold the parts together when the machine is lifted by the yoke 33. A head 52 formed on the inner end of the pin coacts with a thrust washer 53 engaging the inner race ring of the upper bearing 43, and a nut 54 threaded on the lower end of the pin bears against the thrust plate 48 to prevent relative axial movement of the parts during the lifting operation.

It will be evident that the socket structure above described holds the column 25 rigidly in an upright position during the machining operations, and through the medium of the pin 51 maintains the parts in assembled relation when the machine is lifted while permitting rotative adjustment of the column with a minimum of effort. To prevent undesired rotation of the column, provision is made for contracting a band 56a encircling the upper end portion of the socket member 36 to frictionally clamp the column to the member. For this purpose the band 56a is formed with a vertically disposed slot 55 (Fig. 5) which permits a limited yielding movement of the sides thereof. A cross shaft 56 rotatably anchored at one side of the slot and having a cam element 57 engageable with a shoulder formed on the other side of the slot is operative when rotated to draw the adjacent ends of the band together for effecting the clamping. A screw 57a secures the band to the flange 55a and thus serves to hold the column 25 stationary when the band 56a is clamped to the socket 36. It will be understood, of course, that the sides of the band spring apart when the clamping pressure is relieved, thus freeing the column for rotation. Operation of the clamping shaft is effected through the medium of a hand lever 58.

Suitable contact means is provided in the socket structure for providing electrical connections between the electrical elements mounted on the movable and stationary parts of the machine. The contact means as shown in Fig. 4 includes a series of contact rings 50a encircling the member 36 and suitably supported thereon by blocks 51a of insulating material. Cooperating with the rings 50a are a series of contact fingers or brushes 52a (Fig. 5) supported by a bracket 53a welded or otherwise rigidly secured to a cylindrical shield member 54a secured to the flange 55a on the column 25 and rotatable therewith. The brushes 52a are connected with the electrical elements on the removable machine parts, while the control rings connect with those on the stationary machine parts, so that the circuit connections are maintained in all positions of the column without the difficulties and dangers of fouling the conductor cables upon rotation of the column.

*Crossrail and slide*

To minimize twisting stresses on the column the crossrail 27 is constructed so as to straddle the column and the slide 26 upon which it is directly supported. To this end the crossrail is made up of two similar side members, each comprising an elongated channel-shaped central section 60 (Fig. 6) with outwardly turned flanges 61 and 62 along its upper and lower edges which are finished to provide spaced parallel guide surfaces 63 and 64. The side members are assembled in side by side relation on opposite sides of the slide, and are secured together at one end by a housing 65 for the transmission 29 to which the ends of the members are bolted or otherwise rigidly secured. A casing 66 (Fig. 2) forming a part of the swivel connection 39 for the headstock 28 serves to secure the other ends of the members together as will appear presently.

To accommodate the crossrail 27, the slide 26 is provided at opposite sides with suitable means for engaging the guide surfaces 63 and 64 of the rail side members, whereby the rail is supported and guided for endwise movement transversely of the column 25. Referring to Figs. 6-8 of the drawings, the slide 26 as herein shown comprises a generally rectangular body 70 having a vertically disposed cylindrical opening 71 dimensioned to receive the column 25. The body is slotted vertically at one side, as indicated at 72 (Figs. 7 and 8) so that the diameter of the opening 70 may be expanded or contracted, as required, to obtain a tight sliding fit with the column. Such adjustments are effected by means of headed screws 73 passing through apertures in a flange 74 at one side of the slot 72 and threaded into an opposed flange 75 at the other side of the slot. It will be understood that these adjustments are required only to fit the slide 26 to the column 25 or to take up wear.

Provision is made whereby a portion of the slide body 70 may be contracted independently of the main portion to frictionally clamp the slide to the column. For this purpose the upper end portion of the body is separated from the remainder of the body by a transverse slot 76 (Figure 7) intersecting the slot 72. The independently flexible strips 77 and 78 thus formed are provided with opposed outwardly projecting flanges 79 and 80 apertured to receive a draw bolt 81 having a stop nut 82 on one end and having the other end pivotally secured to a lever arm 83. The lever arm is fulcrumed on a stud 84 seated in the adjacent flange 79, and has its free end in engagement with a cam member 85 keyed to a cross shaft 86 journaled on the slide. The cam member 85 is shaped so as to rock the lever arm 83 between clamping and release positions upon partial rotation of the shaft 86. Preferably the shaft is extended at opposite sides of the slide and the projecting ends are provided with hand levers 87 to permit convenient manipulation from either side of the machine.

Novel means is provided on the rail slide 26 for supporting and guiding the crossrail for endwise movement. As herein shown, this means includes a plurality of rollers 90 (Figs. 6, 7 and 10) supported on the slide for rotation about vertically disposed axes and a like plurality of rollers 91 (Figs. 7 and 9) supported for rotation about horizontal axes. Rollers 90 are arranged in vertically spaced pairs located respectively adjacent the four corners of the slide and positioned to engage the inner faces of the guide surfaces 63 and 64 of the rail side members, as shown in Fig. 6. The rollers 91 are similarly arranged to engage the upper and lower faces of the guide surfaces 63 and 64 at the four corners of the slide. Overlapping gib plates 92 secured to the slide prevent accidental displacement of the rail from the rollers.

Means is provided for adjusting the rollers 90 transversely of the slide so as to maintain uniform contact with the guide surfaces of the crossrail when the slide is adjusted relative to the column by means of the screws 73. More particularly, the rollers are constructed and arranged for independent adjustment so as to present their contact surfaces in the same parallel planes when the slide is contracted and expanded for purposes of adjustment. To this end each roller is journaled on a stud 93 which is anchored in a bushing 94 rotatably seated in the body 70 of the slide. The bushings are so constructed that the axes of the studs are disposed eccentrically of the rotational axes of the bushings. Accordingly, by turning the bushings the rollers may be moved laterally relative to the slide to a selected position of adjustment. To facilitate such turning, each bushing is formed with a head 95 apertured for engagement by a spanner wrench.

The rollers 91 are likewise mounted for adjustment to facilitate assembly of the machine and to compensate for wear of the guide surfaces of the rail. As shown in Fig. 9, each roller is journaled on the eccentric intermediate portion 97 of a stud 98 seated in alined recesses in the slide body 70 and the gib plate 92. The outer end of the stud 98 is squared for the reception of a wrench by which adjustments are effected and a set screw 99 threaded into the gib plate serves to hold the stud in adjusted position.

With the above arrangement the rollers 91 at the lower side of the crossrail support the same for smooth easy movement and the opposed rollers at the top of the rail effectually prevent tilting when the rail is extended from the slide. The rollers 90 assist in guiding the rail and effectually prevent any lateral movements or wobbling of the rail when the machine is in use.

In the exemplary machine, power driven means is provided for traversing the slide 26 of the column and manually operated means is provided for shifting the rail 27 on the slide. Referring to Figs. 6, 8 and 14 of the drawings, the slide traversing means includes a pinion 100 rotatably supported on the slide and coacting with a rack 101 secured to and extending longitudinally of the column 25. The pinion is driven by the motor M2 through suitable speed reduction gearing 102. To reduce the load on the motor and associated mechanism, the weight of the slide and parts carried thereby is counterbalanced by a counterweight 103. The counterweight as herein shown is of cylindrical form and is enclosed within the hollow column 25. Flexible members, such as chains 104, operatively connect the counterweight 103 with the slide 26 at opposite sides of the column, the chains being guided over suitable pulleys provided in the cap 32.

The means for shifting the rail 27 relative to the head preferably comprises a cross shaft 105 (Figs. 6 and 14) journaled in the side members of the rail and projecting at opposite sides thereof. Hand wheels 106 are secured to the projecting ends of the shaft for convenience of manipulation. The shaft 105 is connected through the medium of bevel gears 107 with a shaft 108 extending longitudinally of the rail, which latter shaft is connected through suitable gearing 109 to drive a pinion 110 meshing with a rack 111 secured to and extending longitudinally of the rail. As shown in Fig. 6, the gearing 109 and pinion 110 are enclosed in a housing 112 carried by one of the rail members.

Headstock and swivel connection

Figure 11:
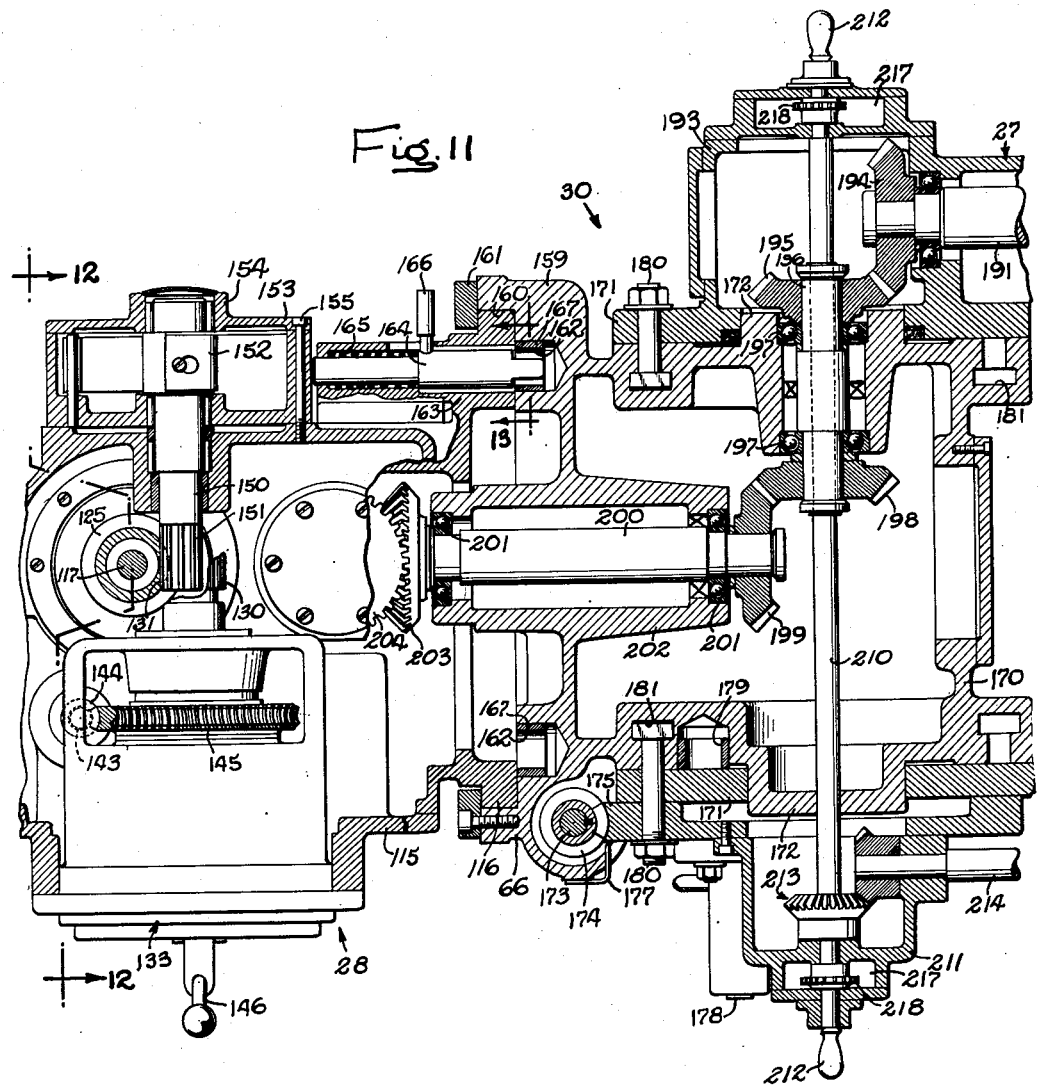
Fig. 11 is a sectional view of the headstock and associated elements taken in a horizontal plane substantially on the line 11—11 of Fig. 1.

The headstock 28 is generally similar in contruction to the headstocks commonly used in horizontal boring machines except for the omission of the spindle speed change transmission which is remotely located to improve the balance of the machine structure. Referring to Figs. 1, 11 and 12 of the drawings, the headstock 28 as herein shown comprises a generally rectangular housing 115 having on its rear face an annular guide flange 116 by which it is rotatively supported on the swivel casing 66, as will appear presently. Mounted in the housing 115 with one end projecting therefrom is a tool supporting spindle 117 adapted to be rotatably driven and to be shifted axially for feeding the tool to the work. The spindle 117 extends through an elongated tubular member or sleeve 118 which is journaled at opposite ends in antifriction bearings 119 seated in recesses in the housing 115. The bearings are confined between a shoulder 120 adjacent the outer end of the sleeve and a collar 121 secured to the rear end thereof, whereby the sleeve 118 is rigidly held against axial movement. As will be seen by reference to Fig. 12, the lower end of the sleeve 118 projects from the housing 115 in concentric relation to the spindle 117 and may be utilized for supporting a milling cutter or similar tool in well known manner, if desired.

The spindle 117 is fitted in the sleeve 118 for axial sliding movement relative thereto while a key 122 operating in a slot in the sleeve and engaging in a longitudinal spline or keyway 123 in the spindle locks the elements against relative rotation. In accordance with the invention, the key 122 is arranged to project outwardly of the sleeve 118 and to engage in a keyway in a driving gear 124 mounted on the sleeve to provide a direct driving connection from the gear to both the sleeve and the spindle 117. The gear 124 is driven from the speed change transmission 29 at the remote end of the rail 27 through suitable shafts and gearing to be described hereinafter.

Provision is made for feeding the spindle 117 in either direction at selected speeds in timed relation to its rotation. As shown in Fig. 12, the inner end of the spindle, which is of reduced diameter, is extended through a nonrotatable ram 125 and journaled at opposite ends thereof in roller bearings 126. Axial movements of the ram are transmitted to the spindle through suitable thrust bearings 127. In the particular structure illustrated, the bearings at the extreme inner end of the spindle and ram are enclosed by a hollow cap 128 adapted to be filled with oil or other lubricant. In the particular machine illustrated, the ram projects substantially beyond the upper wall of the housing 115 and is accommodated in an extension 129 removably secured thereto.

Feed movements are imparted to the ram 125 by a pinion 130 meshing with a rack 131 extending longitudinally of the ram. The pinion is driven from the sleeve 118 through a speed changer 132 and a master clutch 133 as shown in Figs. 12 and 14. The speed changer 132 may be of conventional type and includes a shiftable clutch member 134 operable to establish driving connections of any of three selected gear ratios between an input shaft 135 and an output shaft 136. The gearing for the speed changer is enclosed in a compartment formed by a partition 137 in the headstock housing 115 adjacent the forward wall thereof. A hand lever 138 for shifting the clutch member 134 is accessible at the front of the headstock.

In the exemplary machine, the input shaft 135 of the speed changer is driven directly from the sleeve 118 by a spiral gear 140 keyed to the sleeve and a pinion 141 fast on the shaft. The output shaft 136, in the present instance disposed parallel to the input shaft 135, is connected through bevel gears 142 with a shaft 143 which, through a worm 144, drives a worm-wheel 145 rigid with the driving element of the master clutch 133. The clutch may be of any suitable type, such as that disclosed in the Gallimore Patent No. 1,858,491, granted May 17, 1932. Hand levers 146 accessible at the front of the head are provided for engaging and disengaging the clutch. For manual adjustment of the spindle, the shaft 143 is extended through the headstock housing 115 and provided with a hand wheel 146'.

The overall dimensions of the headstock are reduced to a minimum by utilizing a relatively short spindle 117 and constructing the ram 125 of a diameter such that it may enter the end of the sleeve 118 to provide the necessary bearing support as the spindle is fed outwardly. To prevent scoring of the sleeve 118 in its rotation relative to the stationary ram 125, the sleeve is provided at its inner end with a removable bushing 147 of bronze or other suitable material. It is desirable, of course, that the ram fit snugly in the bushing so as to provide rigid bearing support for the spindle along the entire length of the sleeve irrespective of the position of the spindle therein.

Novel means is provided for counterbalancing the spindle 117 and ram 125 and for returning them to retracted position. The counterbalancing means includes spring means or the like yieldably urging the spindle 117 toward the retracted position and adjustable to vary the retracting force for different angular positions of the headstock. As herein shown, the counterbalance comprises a shaft 150 journaled in the housing 115 with its axis disposed transversely of the ram 125 and having its outer end projecting at one side of the housing. At its inner end, the shaft 150 is provided with a gear 151 meshing with the rack 131 on the ram. The retracting spring means comprises an elongated steel spring 152 anchored at one end to the projecting end of the shaft and at the other end to a cylindrical casing 153 which has an axial hub 154 rotatably supported on the end of the shaft 150. By rotating the casing 153 the spring may be wound around the shaft so as to exert any desired torque thereon. Suitable means, such as bolts or machine screws 155, serve to secure the casing to the housing 115 in any adjusted position. It will be appreciated that the spring 152 is adjusted to apply maximum torque to the shaft 150 when the spindle is operated in a vertical position, and suitably adjusted to reduce the torque so that it is just sufficient to retract the spindle when it is operated at an angle or in a horizontal position.

As indicated heretofore, the headstock housing 115 is provided on one face with an annular guide flange 116 for supporting it upon the swivel casing 66. Referring to Fig. 11 of the drawings, the casing 66 is formed at its outer end with a generally cylindrical portion 159 having a recess 160 dimensioned to receive the flange 116 with a sliding fit. A retaining ring 161, bolted or otherwise secured to the casing and overlapping the inner face of the flange, holds the parts in assembled relation, while permitting rotation of the headstock relative to the casing about an axis substantially perpendicular to the axis of the spindle 117.

Figure 13:
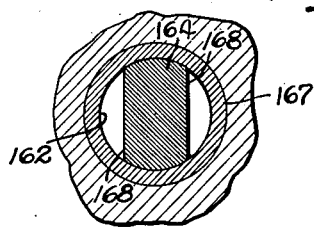
Fig. 13 is a sectional view of the headstock locating means ttaken in a vertical plane substantially on the line 13—13 of Fig. 11.

To facilitate accurate location of the headstock in selected angular positions of adjustment, the casing is formed with a plurality of locating holes 162 opening into the recess 160 and arranged in circular series concentric with the recess. Slidably supported in a hollow boss 163 on the housing 115 is a plunger 164 adapted to be projected into the holes 162 selectively by means of a spring 165 acting on the inner end of the plunger. A laterally projecting finger piece 166 on the plunger permits it to be retracted to free the head for rotation. The locating holes 162 are preferably fitted with removable bushings 167 which are readily replaceable when they become worn, and the nose portion of the plunger is preferably rounded or slightly tapered at its end to facilitate its entry into the bushings. Moreover, the sides of the plunger may be milled out as indicated at 168 (Fig. 13) to avoid any possibility of jamming against the walls of the bushing.

The cylindrical portion 159 of the casing 66 merges into a generally rectangular box-like inner portion 170 adapted to fit between the side members of the crossrail 27 which are formed with longitudinally directed flanges 171 adapted to lie flush against the sides of the casing. The side walls of the casing are formed with cylindrical bosses 172 dimensioned to engage in complemental openings in the flanges 171, thus constituting trunnions about which the casing may be pivoted relative to the cross rail. Adjustment of the casing is effected through the medium of a shaft 173 journaled therein and rigidly held against endwise movement. A worm 174 fast on the shaft 173 meshes with a segmental worm gear 175 bolted or otherwise rigidly secured to the flange 171 of one of the rail members. Accordingly, upon rotation of the shaft, the worm travels around the segment gear and carries with it the casing 66 and the headstock which is mounted thereon. In the exemplary machine the segment gear 175 is constructed so as to permit the headstock to be rocked from the horizontal position shown in broken lines in Fig. 1 with the spindle facing outwardly to a position spaced 180° therefrom in which the spindle is also disposed in a horizontal plane but faces inwardly. It will be understood, of course, that the headstock may be rotated while in either of the extreme positions or any intermediate position to orient the spindle in any desired direction. A ratchet lever 176 is provided on the projecting end of the shaft for effecting manual adjustment of the headstock.

For convenience of adjustment, the outer face of the gear 175 may be graduated, as shown in Fig. 1, for cooperation with a pointer 177 carried by the casing to indicate the relative angular relationship of the parts in various swivel positions. A spring-pressed plunger 178, similar to the plunger 164 above described, may be provided on the rail member for cooperation with locating holes 179 (Fig. 11) in the casing 66 to locate the same precisely in selected positions of adjustment. Such adjustments are normally made while the machine is being set up for operation, and during operation the parts are securely locked together by headed bolts 180 passing through the rail flanges 171 and operating in T-slots 181 in the casing.

*Spindle drive*

The provision of a speed-change transmission separate from the headstock 28, and the mounting of the transmission, together with the driving motor, at the end of the crossrail remote from the headstock provides a lightweight well-balanced structure which materially reduces the stresses imposed on the supporting frame-work of the machine and which materially facilitates the adjustment of the same. The transmission 29 through which the spindle 117 of the instant machine is driven may be of any suitable character, that shown being a nine-speed sliding-clutch transmission equipped with crank-type adjusting means similar to that disclosed in the Gallimore Patent No. 2,106,731, granted February 1, 1938. As shown in Fig. 14, the transmission has an input shaft 185 connected with the motor M1 by gearing 186, and an output or drive shaft 187 projecting from the side of the housing 65 adjacent one side of the crossrail 27. The motor M1 in this instance is mounted on the top of the housing which, as explained heretofore, is bolted to the back end of the crossrail 27. A short adjusting shaft 188 projects forwardly parallel to the shaft 187 from a gear box 189 (Fig. 1) on the opposite side of the housing which carries the gearing 190 and associated parts of the clutch shifting or speed control mechanism.

A driving connection from the shaft 187 to the sleeve 118 in the headstock is provided by a shaft 191 extending longitudinally through the central section 60 of one of the crossrail members. The shaft 191 is connected at one end to the shaft 187 by a coupling 192, and its other end projects into and is journaled in a gear box 193 (Fig. 11) mounted on the rail member adjacent the opening for the trunnion boss 172 of the swivel casing. A bevel gear 194 keyed to the shaft 191 within the gear box is drivingly engaged with a bevel gear 195 fast on a tubular shaft 196 journaled in bearings 197 seated in the boss 172 of the casing 66. The shaft 196 is thus disposed with its axis coincident with the pivotal axis of the casing 66 so that the driving connection between the shafts is maintained in all adjusted positions of the casing.

At its inner end, the shaft 196 has a bevel gear 198 drivingly engaged with a bevel gear 199 keyed to the inner end of a shaft 200 supported in the casing 66 with its axis coincident with the rotational axis of the headstock. As shown in Fig. 11, the shaft 200 is journaled at opposite ends in bearings 201 seated in an elongated sleeve member 202 formed integral with or rigidly secured to the walls of the casing 66. A bevel gear 203 on the outer end of the shaft meshes with a similar gear 204 fast on a shaft 205 (Fig. 14) journaled in the headstock. The latter shaft has a pinion 206 meshing with the driving gear 124 on the sleeve 118 heretofore described. In the rotative adjustment of the headstock, the gear 204 rolls over the gear 203 and thus maintains the driving connection with the spindle 117 in all adjusted positions of the headstock 28.

To facilitate control of machining operations, means is provided whereby the attendant may regulate the spindle speed while standing close to the headstock and from either side thereof. The regulating or control means comprises a shaft 210 (Figs. 11 and 14) extending transversely of the crossrail 27 through the tubular shaft 196 and concentric with the pivotal axis of the swivel casing 66. The shaft 210 is journaled at one end in the gear box 193 and at the other end in a second gear box 211 mounted on the crossrail member. The ends of the shaft 210 project beyond the respective gear boxes and are provided with suitable handles 212 for manual actuation.

Bevel gearing 213 enclosed in the gear box 211 drivingly connects the shaft 210 with a shaft 214 which extends longitudinally of the crossrail member and is connected by a coupling 215 with the adjusting shaft 188 of the speed change transmission. Thus by rotating either of the handles 212, the transmission may be adjusted to drive the spindle 117 at any selected speed within its range. Toothed indicator wheels 216 mounted within compartments 217 in the gear boxes 193 and 211 adjacent the handles 212 and driven by pinions 218 fast on the shaft 210 provide visual indication of the setting of the transmission.

*Brief resumé of operation*

In setting up the machine for operation, it is lifted by a suitable crane or hoist, and carried to the work which may rest upon the floor or on a horizontal platform provided for the purpose. The bed is leveled up by means of the jacks 16 so as to locate the guideway 18 in a horizontal plane. It is unnecessary to anchor the bed to the floor as the weight of the machine is sufficient to maintain it in position for the machining operations within its capacity.

The various adjustments provided in the machine enable it to operate over a large area without being moved from a set position. Thus, by shifting the carriage 19 along the guideway 18 or the crossrail 27 relative to the slide 26, or by rotative adjustment of the column 25, the tool spindle 117 may be presented at any point within the extensible range of the crossrail and at either end or either side of the machine bed. The vertical location of the spindle 117 may be adjusted, of course, by raising or lowering the slide 26 on the column 25. Moreover, the tool spindle 117 can be set in any desired angular position with respect to the work by adjustment of the headstock 28 about its double swivel mounting 30.

Such adjustments are effected quickly and accurately through the medium of the motors M and M2 and the manual adjusting devices provided in the machine. To facilitate control, the motor switches 219, which are preferably of the push button type, may be mounted on a panel 220 supported by a swinging bracket 221 (Fig. 1) carried on the slide 26. The panel is preferably located so that the switches are readily accessible to the attendant while standing close to the work and, of course, may be swung to either side of the head as required.

The tool spindle 117 may be rotated at any one of nine different speeds by appropriate setting of the speed control lever 212 which is readily accessible to the attendant while standing close to the work. Rotation of the spindle may be initiated or interrupted, as required, by starting or stopping the motor M1. Reversal of the direction of spindle rotation is effected by reversing the driving motor, such control being effected by means of the push button switches 219.

The tool spindle may also be fed to the work at any one of three different speeds determined by the setting of the feed lever 138. Starting and stopping of the feed is effected by engagement or disengagement of the master clutch 133 through manipulation of the clutch levers 146. The direction of feed, of course, depends upon the direction of rotation of the spindle from which the feed mechanism is directly driven, as hereinbefore described.

It will be apparent from the foregoing that the invention provides a machine tool of novel and advantageous construction which is particularly well adapted for machining castings or other metal structures that are too large to be handled by conventional machine tools. The wide range of adjustability enables the machine to operate over a substantial area in a single setting, and the tool may be presented to the work in substantially any desired position. The machine is of sturdy construction, well balanced and capable of performing a large variety of 2,619,879

13 machine operations with a high degree of precision.

I claim as my invention:

1. In a machine of the class described, in combination, a bed, an upright column supported on said bed, a slide supported and guided for vertical movement on said column, a crossrail mounted on said slide for endwise movement in a horizontal plane, a headstock including a rotatable tool supporting spindle, means supporting said head at one end of said crossrail for pivotal movement about an axis perpendicular to the longitudinal axis of the rail, a speed change transmission supported at the other end of said crossrail, means providing a driving connection between said transmssion and said spindle control means for said transmission including a cross shaft supported for rotation about an axis coincident with the pivotal axis of the headstock and projecting at opposite sides of the rail, manually operable handles fixed on the projecting ends of the shaft, and a second shaft extending longitudinally of said rail and connecting said cross shaft with said transmission.

2. In a machine of the class described, in combination, an upright column, an elongated crossrail, means adjustable vertically on said column supporting said crossrail for endwise movement transversely of the column, a headstock including a rotatable tool supporting spindle, means supporting said headstock at one end of said crossrail for pivotal movement about an axis perpendicular to the longitudinal axis of the rail, driving means for said spindle including a speed change transmission supported at the other end of said crossrail, means providing a driving connection between said transmission and said spindle including a pair of interconnected shafts, one extending longitudinally of the rail and the other extending transversely of the rail with its rotational axis coincident with the pivotal axis of the head, control means for said transmission including a cross shaft projecting at opposite sides of said crossrail, manually operable handles fixed on the projecting ends of said cross shaft, and a second shaft extending longitudinally of said rail to connect said cross shaft with said transmission, said other drive shaft being tubular and said cross shaft being extended therethrough in coaxial relation.

3. In a machine tool of the class described, in combination, a rail slide assembly including side members having their adjacent faces complementally shaped to receive a cylindrical supporting column therebetween, said members being rigidly connected together at one end and interconnected at the other end for adjustment toward and from each other, supporting and guiding means on the outside faces of said members each including rollers adjacent opposite ends of the members, and means supporting said rollers for adjustment laterally of the slide assembly to maintain their faces in parallel planes in the various adjusted positions of said members.

4. A support for a crossrail having laterally spaced pairs of parallel guides, said support comprising a pair of members disposed in side-by-side relation, said members being rigidly connected together at one end and interconnected at the other end for adjustment toward and from each other, and rail supporting and guiding means including rollers on the outer faces of said members adjacent opposite ends of the members, said rollers being supported for individual adjustment of laterally of the members so as

14 to maintain uniform contact with the parallel guides of said crossrail in all adjusted positions of said members.

5. In a machine tool, in combination, a cylindrical upright column, a rail slide assembly supported and guided for vertical movement on said column, said slide comprising a pair of members assembled in side-by-side relation and having their adjacent faces complementally shaped to receive said column, said members being rigidly connected together at one end and interconnected at the other end for adjustment transversely of the column, a crossrail straddling said slide and having longitudinally extending parallel guides disposed on opposite sides of the slide, and means on said members engageable with said guides for supporting and guiding the crossrail, said supporting and guiding means being adjustable transversely of the members so as to maintain engagement with the guides in all adjusted positions of the members.

6. In a machine tool, in combination, a cylindrical upright column, a rail slide assembly supported and guided for vertical movement on said column, said slide comprising a pair of members assembled in side-by-side relation and having their adjacent faces complementally shaped to receive said column, said members being rigidly connected together at one end and interconnected at the other end for adjustment transversely of the column, a crossrail straddling said slide and having longitudinally extending parallel guides disposed on opposite sides of the slide, and outwardly facing rollers carried by said members engageable with said guides to support and guide said crossrail, said rollers being mounted on eccentric shafts to provide for their individual adjustment to maintain engagement with the guides in all adjusted positions of said members.

7. In a machine tool headstock, in combination, an elongated tubular sleeve, bearings supporting said sleeve for rotation, a tool supporting spindle slidable axially in said sleeve and adapted to be projected from one end thereof, a driving gear mounted on said sleeve adjacent said one end, and a single key providing a driving connection between said gear, said sleeve and said spindle.

8. In a machine tool headstock, in combination, an elongated sleeve rotatably supported in the headstock, said sleeve having a longitudinally disposed slot opening in one side adjacent one end of the sleeve, a tool supporting spindle slidable axially in said sleeve and adapted to be projected from said one end of the sleeve, a driving gear mounted on said sleeve in alinement with said slot, and a key in said slot adapted to engage in keyways in said gear and in said spindle to hold the gear, the sleeve and the spindle against rotation relative to each other.

9. In a machine tool of the class described, in combination, an upright column, a crossrail supported on said column for adjustment vertically and horizontally thereon, said rail having side members spaced apart laterally at one end of the rail, a casing having an end portion adapted to fit between said side members, coacting guide means on said end portion of the casing and said side members securing the casing to the rail for pivotal movement about an axis transversely disposed with respect to the longitudinal axis of the rail, a circular guideway at the other end of said casing, and a headstock mounted on said guideway for rotative adjustment about an axis substantially perpendicular to said pivotal axis.

10. In a machine tool of the class described, in combination, an upright column, a crossrail having laterally spaced side members disposed on opposite sides of the column and supported thereon for vertical and horizontal adjustment, a headstock having a rotatable tool supporting spindle, power operated means on said rail for driving the spindle including a drive shaft extending longitudinally of one of said side members, means supporting said headstock at one end of said rail for universal adjustment, said supporting means including a casing having an end portion supported between said side members for pivotal movement about an axis transverse to the longitudinal axis of the rail, guide means at the other end of said casing supporting said headstock for rotative adjustment about an axis substantially perpendicular to said pivotal axis, and means in said casing providing a driving connection from said drive shaft to said headstock, said connecting means including two interconnected shafts, one having its axis coincident with the pivotal axis of said casing and the other having its axis coincident with the rotative axis of the headstock.

11. In a machine tool having a crossrail adjustably supported on an upright cylindrical column, in combination, means supporting said column for rotation about its longitudinal axis comprising a generally conical socket member open at its lower end, a thrust plate removably secured to said member and extending over said opening, a cylindrical pin extending inwardly from said plate coaxial with the column, said column having a recess at its lower end for the reception of said pin, an antifriction bearing mounted in said recess adapted to transmit the axial thrust of the column to said plate and the radial thrust of the column to said pin, and a radial thrust bearing interposed between said member and said column at a point spaced substantially from the lower end of the column, said radial thrust bearing including a series of roller elements disposed within an inwardly facing circumferential groove formed in the upper end of said member and cooperating with an outwardly facing circumferential bearing surface formed on said column.

EVERETT E. HOSEA.

REFERENCES CITED

The following references are of record in the file of this patent:

UNITED STATES PATENTS

| Number | Name | Date |
|---|---|---|
| 1,177,741 | Turner | Apr. 4, 1916 |
| 1,376,169 | Sears | Apr. 26, 1921 |
| 1,530,554 | Gossett | Mar. 24, 1925 |
| 2,033,141 | Kraut et al. | Mar. 10, 1936 |
| 2,180,289 | Carlton et al. | Nov. 14, 1939 |
| 2,242,293 | Eden et al. | May 20, 1941 |
| 2,275,291 | Bannow | Mar. 3, 1942 |
| 2,301,171 | Morton et al. | Nov. 3, 1942 |
| 2,310,870 | Retterath | Feb. 9, 1943 |
| 2,330,426 | Hoelscher | Sept. 28, 1943 |
| 2,341,061 | Rhodes et al. | Feb. 8, 1944 |

FOREIGN PATENTS

| Number | Country | Date |
|---|---|---|
| 6,150 | Great Britain | Apr. 24, 1915 |